J. O'NEIL.
Churn.
No. 7,531.
Patented July 30, 1850.
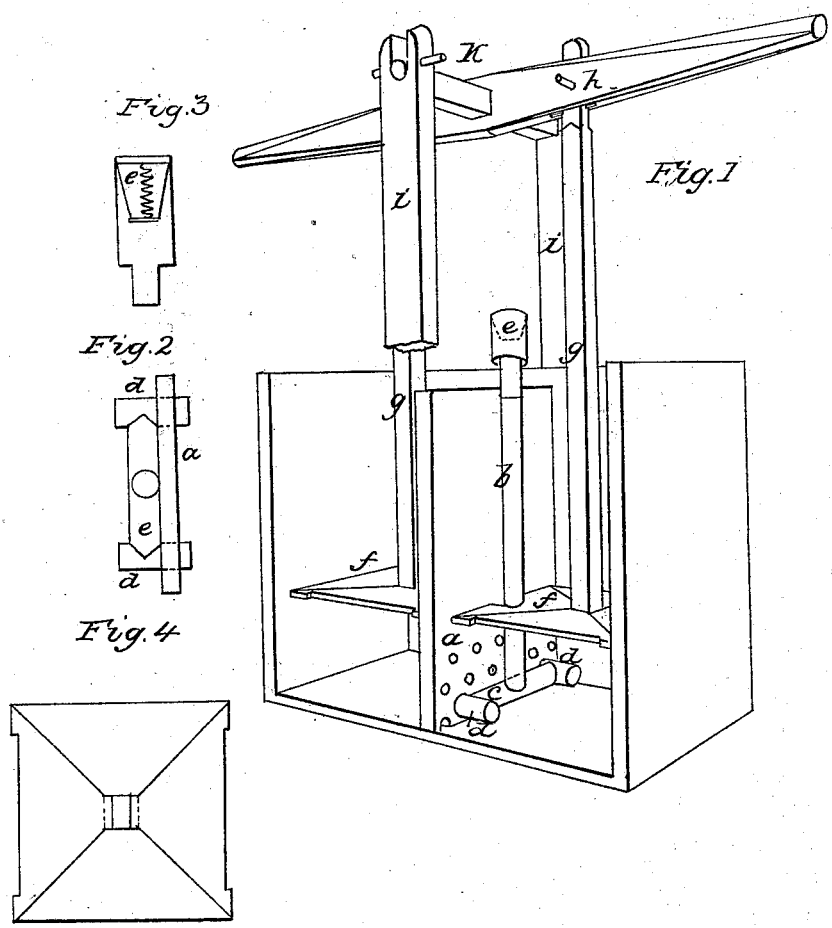

UNITED STATES PATENT OFFICE.

JNO. O'NEIL, OF XENIA, OHIO.

ATMOSPHERIC CHURN.

Specification of Letters Patent No. 7,531, dated July 30, 1850.

*To all whom it may concern:*

Be it known that I, JOHN O'NEIL, of Xenia, in the county of Greene and State of Ohio, have invented a new and useful Improvement in Churns; and I do hereby declare that the following is a full and exact description thereof, reference being had to the accompanying drawings, which make part of this specification.

To enable others skilled in the art to make and use my invention I will proceed to describe its construction and operation.

I have constructed my churn tub in this instance in the form of a parallelogram and of sufficient height to prevent the cream from being worked out by the operation of the churn, it is divided into two apartments by a movable partition having its lower edge perforated for the passage of the cream from one apartment to the other as is represented at *a*, Figure 1 of the accompanying drawings, with this partition. I have connected an air tube marked *b*, in Fig. 1; its form and position being there represented, the vertical part of the tube and a horizontal piece of tube in connection with its bottom end lay against the side of the partition where it is confined, on each end of the horizontal tube marked *c*, is another tube attached horizontally but at right angles with it, one end of each of these last mentioned pieces of tube *d, d,* Fig. 1, also of the section Fig. 2, passes through the lower edge of the partition *a* where they serve the double purpose of breaking the cream as it passes through and of communicating the current of atmosphere to the opposite apartment of the churn, which is produced by suction from the rapid passage of the cream through the pipes *d, d.* Fig. 3, is a vertical section of the bowl or top part of the tube *b* Fig. 1. The darker shade marked *e* is a cup constructed within the bowl having its bottom loose but hinged to one side of the cup to operate as a valve, it being kept closed by the aid of a spiral spring attached to the bottom and to a cross piece at the top of the cup for that purpose or by any other convenient mode of constructing a valve, at the lower end of this bowl is attached a small portion of the vertical pipe *b* made so as to slip off and on at pleasure through a hole in the lid of the churn. Fig. 4 is plan of the dasher or more properly the plunger, having a portion of two of its sides cut away leaving about 1½ inches standing at each corner the full width, from ¼ to ½ of an inch may be cut out for the purpose of gathering the butter above the dasher as it is churned.

*f, f,* are the plungers in the perspective view Fig. 1.

*g, g,* are their handles or stems running up above the churn and are connected with a rocking lever as is represented at *h*.

*i, i,* are two uprights or standards one being firmly attached to each side of the churn to serve as bearers for the axle *k*, which passes through the lever *h*, and forms its fulcrum. One of the sides of the churn, its top, and a portion of one of the uprights *i*, is represented as being displaced the better to show the interior arrangement of the churn, a hole is cut out of one side of one of the plungers *f*, to admit its free passage up and down over the air tube. The action of this churn produced by rocking the lever handle *h*, or raising and depressing alternately the end, the plungers *f, f,* are alternately raised and depressed, the depression of one, and the same time the elevation of the other causes the cream to be violently rushed through the horizontal tubes *d, d*, and the holes in the partition from one apartment to the other alternately. The passage of the cream through the tubes *d, d*, causes a suction of the atmosphere down the pipe *b*, through the horizontal part of the tube *c*, to *d, d*, and thence to the body of cream in each apartment of the churn where it is thoroughly diffused through the cream.

What I claim as my invention and desire to secure by Letters Patent is—

The construction of the air tubes *b, c, d d*, in combination with the plungers a partition as set forth whereby the cream is thoroughly agitated, and intimately mixed with atmospheric air by forcing it alternately to the opposite side of the partition, through branches of the air tube, as herein set forth.

JOHN O'NEIL.

Witnesses:
I. A. SEXTON,
GEO. L. PAINE.